United States Patent [19]

Itagaki et al.

[11] 4,350,773

[45] Sep. 21, 1982

[54] WEAKLY ACIDIC CATION EXCHANGE RESIN AND PROCESS FOR PRODUCING SAME

[75] Inventors: Takaharu Itagaki, Yokohama; Hidenaga Ouchi, Komae, both of Japan

[73] Assignee: Mitsubishi Chemical Industries, Limited, Tokyo, Japan

[21] Appl. No.: 280,522

[22] Filed: Jul. 6, 1981

Related U.S. Application Data

[62] Division of Ser. No. 174,566, Aug. 4, 1980, Pat. No. 4,306,031.

[30] Foreign Application Priority Data

Aug. 14, 1979 [JP] Japan ................................. 54-103352
Oct. 8, 1979 [JP] Japan ................................. 54-129745

[51] Int. Cl.$^3$ ...................... B01J 41/12; C08F 16/06
[52] U.S. Cl. ...................................... 521/31; 521/25; 521/27
[58] Field of Search .......................... 521/25, 27, 31

[56] References Cited

U.S. PATENT DOCUMENTS

| | | | |
|---|---|---|---|
| 3,203,918 | 8/1965 | Goldberg et al. | 525/60 |
| 3,226,380 | 12/1965 | Knight | 521/25 |
| 3,234,160 | 2/1966 | Matsubayashi et al. | 525/60 |
| 3,275,576 | 9/1966 | Flodin et al. | 521/25 |
| 3,640,734 | 2/1972 | Oppenheimer et al. | 525/60 |
| 4,306,031 | 12/1981 | Itagaki et al. | 521/31 |

*Primary Examiner*—William F. Hamrock
*Assistant Examiner*—Peter F. Kulkosky
*Attorney, Agent, or Firm*—Oblon, Fisher, Spivak, McClelland & Maier

[57] ABSTRACT

A weakly acidic cation exchange resin which is obtainable by a reaction of glyoxylic acid and a polyvinyl alcohol cross-linked by cross-linking groups each containing two or more carbon atoms, and has an exchange capacity of 3 meq/g or greater and a swelling volume of 10 ml/g or smaller, as well as a process for producing such cation exchange resin.

15 Claims, No Drawings

WEAKLY ACIDIC CATION EXCHANGE RESIN AND PROCESS FOR PRODUCING SAME

This is a divisional of application Ser. No. 174,566, filed Aug. 4, 1980, now U.S. Pat. No. 4,306,031.

BACKGROUND OF THE INVENTION

1. Field of the Invention

This invention concerns a weakly acidic cation exchange resin having a moderate acidity and a process for producing the same. More specifically, this invention concerns a weakly acidic cation exchange resin having a moderate acidity, a small swelling volume and a great ion-exchange capacity, as well as a process for producing such cation exchange resin. This invention also relates to a porous weakly acidic cation exchange resin having a moderate acidity, a small swelling volume and a great ion-exchange capacity, as well as a process for producing such cation exchange resin.

2. Description of the Prior Art

Weakly acidic cation exchange resins generally employed at present are those of polyacrylic acid type or of polymethacrylic acid type. With the recent progress in the technics for using ion exchange resins, the acidity of these weakly acidic cation exchange resins has become an important factor.

For instance, in heat-regenerative ion exchange resins, it is required that the weakly acidic cation exchange resin and the weakly basic anion exchange resin as used have dissociation constants of good matching to each other. When a cross-linked polyvinylbenzyldimethylamine is used as the weakly basic anion exchange resin, a weakly acidic resin should have a greater acidity than that of the polyacrylic acid type ion exchange resin. A phosphorylated cation exchange resin has a greater acidity than the polyacrylic acid type resin, and it is put to practical use but is not suitable for the heat-regenerative ion exchange resin, since its acidity is too high. There is known no practical resin having a moderate acidity, that is, higher than that of a polyacrylic acid type resin but lower than that of a phosphorylated resin.

It is considered that a weakly acidic cation exchange resin having such a moderate acidity will provide a possibility for the applications to various fields where conventional polyacrylic acid type resins and polymethacrylic acid type resins could not be employed. Examples of the applications are for a buffer in low pH solution, for separation and purification of natural products, and for conversion of carboxylic acid salts having no electron attractive groups at α, β positions into free carboxylic acids as well as for to the heat-regenerative ion exchange resins.

As a weakly acidic cation exchange resin of carboxylic acid type other than the poly(meth)acrylic acid type, reaction products of polyvinyl alcohol in spherical particles and glyoxylic acid are known. For instance, an ionic exchange resin prepared by acetalizing a polyvinyl alcohol in spherical particles through reaction with glyoxylic acid in an aqueous solution containing sulfuric acid and sodium sulfate.

The above reaction is considered to proceed as follows:

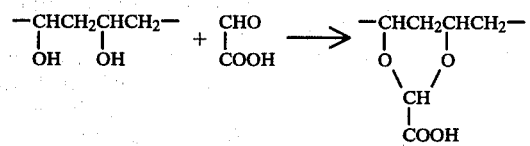

The acetalization products prepared by this process are not, however, practical as an ion exchange resin since the swelling volumes of the products go greater and accordingly the exchange capacity per unit volume is reduced as the exchange capacity increases. For instance, while the products obtained by the process have a swelling volume of 9.0 ml/g for the exchange capacity of 1.49 meq/g, the swelling volume increases to 13.6 m/g for the exchange capacity of 2.42 meq/g and to 15.4 ml/g for the exchange capacity of 3.80 meq/g, respectively. Such a resin has an insufficient exchange capacity per unit volume and it liable to deform by pressure. So it cannot be considered as a practical ion exchange resin. Accordingly, the above process has a drawback in that it can only produce those weakly acidic cation exchangers having small exchange capacity.

SUMMARY OF THE INVENTION

It is an object of the present invention to provide a weakly acidic cation exchange resin having a moderate acidity, a small swelling volume and a great ion-exchange capacity, as well as a process for producing such cation exchange resin.

Another object of the present invention is to provide a weakly acidic cation exchange resin having the swelling volume of a desired low level with all the large exchange capacity in the acetalization product which is obtainable by acetalyzing a specific cross-linked polyvinyl alcohol with glyoxylic acid. Preparation of such a specific polyvinyl alcohol is characterized by using a cross-linking reagent capable of forming cross-linking groups each containing two or more carbon atoms between the molecules of the polyvinyl alcohol.

These and other objects have been attained by providing a weakly acidic cation exchange resin which is obtainable by a reaction of glyoxylic acid and a polyvinyl alcohol cross-linked by cross-linking groups each containing two or more carbon atoms, and has an exchange capacity of 3 meq/g or greater and a swelling volume of 10 ml/g or smaller, and a process for producing a weakly acidic cation exchange resin which comprises bringing a polyvinyl alcohol into reaction with a cross-linking reagent capable of forming cross-linking groups each containing two or more carbon atoms to form a cross-linked polyvinyl alcohol and bringing said cross-linked polyvinyl alcohol into reaction with glyoxylic acid in the presence of an acid and a water soluble salt.

DETAILED DESCRIPTION OF THE PREFERRED EMBODIMENTS

The inventors of this invention have succeeded in keeping the swelling volume at a desirable low level with all the large exchange capacity of the acetalization product which is obtainable by acetalyzing a specific cross-linked polyvinyl alcohol with glyoxylic acid. Preparation of such a specific polyvinyl alcohol is characterized by using a cross-linking reagent capable of forming cross-linking groups each containing two or more carbon atoms between the molecules of the polyvinyl alcohol. Examples of the cross-linking reagent are glutaraldehyde, epichlorohydrin, etc.

The weakly acidic cation exchange resin according to this invention is a reaction product of a polyvinyl alcohol cross-linked by cross-linking groups each containing two or more carbon atoms and glyoxylic acid, and has an ion-exchange capacity of 3 meq/g or larger and a swelling volume of 10 ml/g or smaller.

The weakly acidic cation exchange resin according to this invention can be produced by bringing a cross-linking reagent, capable of forming cross-linking groups each containing two or more carbon atoms, into reaction with a polyvinyl alcohol to form a cross-linked polyvinyl alcohol, and then bringing it reaction with glyoxylic acid in the presence of an acid and a water soluble salt.

For the production of the weakly acidic cation exchange resin according to this invention, a polyvinyl alcohol and a cross-linking reagent are at first subjected to a reaction to prepare a cross-linked polyvinyl alcohol.

Various types of polyvinyl alcohols can be used in the above process. Usually, those having a polymerization degree from several tens to several thousands, preferably, from 200 to 2000 are used. As the degree of polymerization becomes larger, the viscosity increases and therefore it becomes difficult to increase the concentration of polyvinyl alcohol in water. Higher saponification degree is preferred and polyvinyl alcohols having a saponification degree of 50 mol% or greater, particularly, 85 mol% or greater are usually employed.

For the cross-linking reagents used herein, it is necessary that they can react with polyvinyl alcohol to form cross-linking groups each having two or more carbon atoms between the molecules of the polyvinyl alcohol. Such cross-linking reagents include, for example, dialdehydes such as glyoxal, glutaraldehyde and terephthalaldehyde; diepoxide compounds such as 1,2-3,4-diepoxy butane; glycidylethers such as bis-epoxypropylether, ethyleneglycol bis-epoxypropylether and 1,4-butanediol bis-epoxypropylether and epihalohydrins such as epichlorohydrin and epibromohydrin. Preferred cross-linking reagents are glutaraldehyde and epihalohydrin.

The amount of the cross-linking reagent used depends on its kind and the reaction conditions. The reagent is added to the reaction system usually in such an amount that 4-50%, preferably, 8-40% of the hydroxyl groups in the polyvinyl alcohol may react with the cross-linking reagent provided that the reaction proceeds stoichiometrically. If the amount of the cross-linking reagent to react is insufficient, the swelling volume of the resulted ion exchanger goes great. On the other hand, if the reaction amount of the cross-linking reagent to react is in excess, it necessarily leads to resins with only a small exchange capacity.

The cross-linking reaction is, preferably, performed in a suspension reaction: an aqueous solution of a cross-linking reagent and a polyvinyl alcohol is dispersed into a hydrophobic dispersant. The concentration of the polyvinyl alcohol in the aqueous solution is 2-30%, preferably 5-15%. The dispersants usually employed include aromatic hydrocarbons and their halogenated derivatives such as toluene, benzene, chlorobenzene and dichlorobenzene, and aliphatic hydrocarbons, alicyclic hydrocarbons and their halogenated derivatives such as n-heptane, n-hexane, liquid paraffin, cyclohexane, dichloromethane and dichloroethane. They may be used alone or in admixture. The dispersant is used in an amount two or more times, preferably 3-6 times by volume of the aqueous polyvinyl alcohol solution. It is preferred to add, to the dispersant, hydrophobic dispersing stabilizers, for example, hydrophobic cellulose such as ethylcellulose, cellulose acetatebutylate, ethylhydroxycellulose; gum arabic, sorbitan sesquioleate, sorbitan monooleate, sorbitan monostearate and glycerol monostearate, in an amount ranging from 0.05 to 10%, preferably, from 0.1 to 5% based on the dispersant.

In a case where spherical polyvinyl alcohol particles are used as the starting material, those solvents capable of swelling polyvinyl alcohol such as acetone, and dimethyl sulfoxide can be used as the reaction solvent as well as the foregoing compounds used as the dispersant. Although it depends on the kind of the cross-linking reagent, the cross-linking reaction is performed usually at 0° C.–100° C. and, preferably, at 20° C.–80° C. for 1–20 hours, preferably, 2–8 hours. In the cross-linking reaction, acid such as hydrochloric acid and sulfuric acid, or alkali such as sodium hydroxide and potassium hydroxide is used as required. The thus obtained cross-linked polyvinyl alcohol is then separated through filtration from the reaction medium. Then, it is washed with a hydrophilic organic solvent such as acetone and then with water, and used for the subsequent reaction.

In one preferred embodiment of this invention, porous or latently porous cross-linked polyvinyl alcohol is produced, which is characterized by the specific surface area of 5 $m^2/g$ or greater and/or the pore volume of 0.1 ml/g or greater.

The term "latently porous" used for the cross-linked polyvinyl alcohol means herein that the cross-linked polyvinyl alcohol internally contains fine inorganic salts and can be converted into the above porous cross-linked polyvinyl alcohol by extracting to remove the inorganic salts.

The porous or latently porous polyvinyl alcohol provides porous weakly acidic cation exchange resin through the reaction with glyoxylic acid.

Ion-exchange resin are generally classified into two types. One is gel-type resin having no macro pores therein and another is porous resin haing macro pores therein. The gel-type resin and the porous resin, if having the same type of exchange groups, are significantly different each other in their properties. In the case of weakly acidic ion exchange resin, a porous-type resin generally has the following merits as compared with a gel-type resin:

(a) Small voluminal ratio between Na form (salt form) and H form (free acid form)

Generally, the volume of a weakly acidic cation exchange resin increases when the resin changes from the H form to the Na form and, particularly, those gel-type resins with low cross-linking degree and those with high exchange capacity show a remarkable volume change, which may sometimes cause great troubles in their applications. Moreover, the large volume change reduces the strength of the resins remarkably when they are used repeatedly. Such volume change of a resin can, however, be decreased by rendering the resins porous, whereby the foregoing difficulty can be avoided.

(b) High reaction rate

Although reaction rate of a weakly acidic cation exchange resin is lower than that of a strongly acidic cation exchange resin, this defect can be improved considerably by providing the former resin with porous structure.

(c) Applicable to the purification of natural products such as antibiotics

In the separation and purification of natural products, the resin is required essentially to be porous.

The weakly acidic cation exchange resin according to this invention also shows the same merits as above-mentioned when rendered porous, whereby a broader application can be expected.

The porous cross-linked polyvinyl alcohol having a specific surface area of 5 $m^2/g$ or larger can be produced by dispersing an aqueous solution containing a water-soluble salt, a linear polyvinyl alcohol and a cross-linking reagent into a dispersant and conducting cross linking reaction in the suspensed state.

The water-soluble salts usable herein include, usually, chlorides such as sodium chloride, potassium chloride and calcium chloride, nitrates such as sodium nitrate, potassium nitrate and calcium nitrate, sulfates such as magnesium sulfate and phosphates such as sodium phosphate. These water-soluble salts seem to function to precipitate the polyvinyl alcohol from the reaction medium by way of salting out effect when the polyvinyl alcohol increases its molecular weight by reaction with the cross-linking reagent (formation of the precipitates in the reaction medium is estimated from the fact that the reaction medium becomes turbid a little after the initiation of the reaction). Accordingly, these water-soluble salts should be used in a concentration enough to exhibit the above-mentioned salting out effect. The concentration of the water-soluble salt depends on the kind of themselves, and is preferably between 5-12% for sodium chloride but 20% or more for calcium chloride. Generally, the water-soluble salt is used at a concentration ranging from 1 to 40%. The specific surface area of the cross-linked polyvinyl alcohol thus formed can be varied by controlling the concentration of the water-soluble salt.

Latently porous cross-linked polyvinyl alcohol, being capable of having pore volume of 0.1 ml/g or greater, can be produced by dispersion, into a dispersant, the aqueous solution of a linear polyvinyl alcohol and a cross-linking reagent dispersed with fine particles of a water-insoluble inorganic salt, and conducting cross-linking reaction in the suspended state.

The water-insoluble inorganic salts usually used herein include, sulfates such as calcium sulfate, barium sulfate and lead sulfate and phosphates such as calcium phosphate. As afore-mentioned, the water-insoluble salt is dispersed in the aqueous solution of polyvinyl alcohol and cross-linking reagent. The amount of the water-insoluble salt used is, usually, 5-70 g, preferably, 20-60 g per 100 g of the aqueous polyvinyl alcohol solution. Different from the foregoing water soluble salts, these water-insoluble salts are included in the resulting cross-linked polyvinyl alcohol upon cross-linking reaction. Then, when these water-insoluble salts are extracted from the thus formed cross-linked products by using an aqueous acidic solution, pores are left in the cross-linked products at the sites of these salts therein. Accordingly, it is preferred to use water-insoluble salts as fine as possible. The particle size of the salt is usually 10 microns or smaller, particularly, 5 microns or smaller. The pore volume in the cross-linked products can be changed by the control of the concentration of the water-insoluble salt in the aqueous polyvinyl alcohol solution. The thus obtained cross-linked polyvinyl alcohol can be used for the reaction with glyoxylic acid after being extracted with the water-insoluble salt and formed into porous cross-linked polyvinyl alcohol having pore volume of 0.1 ml/g or greater. Alternatively, it can also be subjected to the reaction with glyoxylic acid as it is in a state still containing the water-insoluble salt and can then be converted into the porous ion exchange resin having pore volume of 0.1 ml/g or greater by the extraction of the water-insoluble salt.

Any porous cross-linked polyvinyl alcohol obtained by the process other than above can also be used as long as it provides the acetalization products having specific surface area of 0.5 $m^2/g$ or greater, preferably, 5 $m^2/g$ or greater and/or pore volume of 0.1 ml/g or greater after the reaction with glyoxylic acid.

The reaction between cross-linked polyvinyl alcohol and glyoxylic acid is performed in an aqueous solution at a temperature between 50°-100° C., preferably, 70°-95° C. for 1-30 hours, preferably, 3-8 hours using mineral acid such as sulfuric acid and hydrochloric acid as a catalyst. The glyoxylic acid is used in an amount of 0.4 mol or more, preferably, 0.9-1.8 mol per one mol of the hydroxyl group in the cross-linked polyvinyl alcohol. The concentration of the glyoxylic acid in the reaction system, although somewhat depending on the method of reaction, is usually 1-100 g, preferably, 5-30 g per 100 g of water. The concentration of the mineral acid is usually 0.1-150 g, preferably, 25-80 g per 100 g of water. Further, in carrying out the acetalization, water soluble inorganic salts, such as sodium sulfate, sodium hydrogen sulfate, potassium sulfate, potassium hydrogen sulfate, ammonium sulfate, sodium chloride, potassium chloride and calcium chloride, are dissolved in the aqueous solution. The presence of these salts contributes to the decrease in the voluminal ratio of the sodium form to the free acid form of the thus obtained weakly acidic resin (hereinafter referred to as Na/H voluminal ratio). The concentration of the inorganic salt in the aqueous solution is usually 5-200 g, preferably, 25-100 g per 100 g of water. Particularly, in a case where a gel-type cross-linked polyvinyl alcohol which is neither porous nor latently porous is used as the cross-linked polyvinyl alcohol, the Na/H voluminal ratio of the resulted ion exchange resin is remarkably increased if the inorganic salt is absent. A large additional space is required when such a high Na/H voluminal ratio resin is packed in a column. Swelling pressure is generated when the resin changes its form from the free acidic form to sodium salt form in the column. It is a great disadvantage for the use.

However, weakly acidic resin with Na/H voluminal ratio of 3 or less, preferably, 2 or less can be obtained with ease even from the gel-type cross-linked polyvinyl alcohol by using the salt. In these cases, the salt is used generally at a concentration of 25-100 g per 100 g of water. Its amount to be used depends naturally on the concentration of acid in the reaction medium and the amount of exchange groups to be introduced. Generally, the Na/H voluminal ratio of the obtained resin will increase where the amount of exchange groups introduced is large if the salt concentration is not increased. Therefore, the more the amount of exchange groups is introduced, the higher salt concentration is preferred. Use of sodium sulfate or sodium chloride is generally advantageous.

The reaction products of the cross-linked polyvinyl alcohol and the glyoxylic acid are separated from the reaction medium in conventional manner and washed with water to form a weakly acidic cation exchange resin of free acid form. If the resin contains insoluble salts therein, these salts are extracted and removed by hydrochloric acid or the like.

It is estimated that the cation exchange resin according to this invention has exchange groups of a structure substantially represented as:

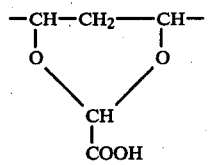

and has moderate acidity. While possibly varied by the production method, the exchange capacity of the resin is usually at least 3 meq/g and the resin having exchange capacity of 4 meq/g or greater can also be produced with ease. However, it can be varied depending on the production method. The swelling volume is usually 10 ml/g or less and the resin with a swelling volume of 5 ml/g or less also be produced with ease. Further, the cation exchange resin according to this invention can be a porous resin characterized by the specific surface area of 0.5 m²/g or greater and/or the pore volume of 0.1 ml/g or greater. The porous resin, preferably, has both of the specific surface area of 0.5 m²/g or greater and the pore volume of 0.1 ml/g or greater together. Generally, those resins having the specific surface area of 5 m²/g or greater are, particularly, preferred. The porous resin according to this invention provides various advantages as described above. For example, the Na/H voluminal ratio of the resin can usually be decreased to 2.0 or less by making the resin porous.

This invention is further described specifically by way of examples but the invention is no way limited only to such examples so long as it is within the scope of the claim. In the specification, all of percentages mean percentage by weight unless otherwise specified. The method of measuring the physical properties employed herein are as follows:

Measurement for specific surface area and pore volume:

Resin treated with an aqueous hydrochloric acid solution is sufficiently washed with water and water is replaced with acetone, which is further replaced with toluene. The resin is dried in a drier under the reduced pressure of 10 mmHg at 30° C. for 24 hours and the measurements are conducted as below: Specific surface area:

Measured by B.E.T. method utilizing the adsorption of nitrogen gas using Quantasorp (Uasa Battery Co.) Pore volume:

Measured by mercury enforced type porosimeter (Carlo-Erba Co.).

Exchange capacity, moisture content and swelling volume:

H form resin regenerated with an aqueous solution of hydrochloric acid and then sufficiently washed with desalted water is placed in a 10 ml measuring cylinder and 10 ml of the resin is accurately sampled by slightly tapping the bottom of the cylinder. The resin is dewatered in a centrifuge at 350 G for five minutes and then accurately weighed for its weight ($a_1$g). Then, the resin is placed in 200 ml of an aqueous 0.2 N sodium hydroxide solution and shaken at room temperature for 24 hours. 20 ml of the aqueous sodium hydroxide solution is titrated with 0.1 N hydrochloric acid. Another 10 ml of the resin is accurately sampled, dewatered and weighed for its weight ($a_2$g), respectively in the same manner as above. Then, the resin was dried in a vacuum drier at 60° C., under 10 mmHg for 24 hours, and the weight (Cg) is accurately weighed again.

$$\text{Water content} = \frac{a_2 - C}{a_2} \times 100 \ (\%),$$

$$\text{Degree of swelling} = 10/C \ (\text{ml/g}),$$

$$\text{Exchange capacity} = \frac{(h_o - h) \times 0.1 \times f \times 200/20}{a_1 \times C/a_2}$$

$$= (h_o - h) \times f \times \frac{a_2}{a_1} \times C \ (\text{meq/g})$$

where $h_o$ and h represent the amounts (ml) of hydrochloric acid required for the titration before and after the resin is placed, respectively and f represents the factor of hydrochloric acid.

Na/H voluminal ratio:

Resin is regenerated with an aqueous solution of hydrochloric acid, washed with water. After this conditioning, it is converted into an Na form with an aqueous solution of sodium hydroxide and then sufficiently washed with desalted water.

The resin is placed in a 10 ml measuring cylinder and 10 ml of the resin is accurately sampled by slightly tapping the bottom of the cylinder. The resin is converted into the H form with an aqueous solution of hydrochloric acid and then sufficiently washed with desalted water. The volume of the resin (d ml) is measured again using a 10 ml measuring cylinder by slightly tapping its bottom.

Na/H voluminal ratio = 10/d

EXAMPLE 1

(A) Production of cross-linked polyvinyl alcohol

To a three-necked distillation flask equipped with a stirrer and a reflux condenser, was charged 750 ml of toluene, to which 2.5 g of ethylcellulose (manufactured by Hercules Incorporated, trade mark Ethylcellulose N-100) was dissolved at room temperature.

200 g of an aqueous 10% polyvinyl alcohol solution (polyvinyl alcohol having degree of polymerization of 500 and degree of saponification of 98.5–100 mol%, manufactured by The Nippon Synthetic Chemical Industry Co., trade mark GOHSENOL NL-05) was separately charged in a beaker and cooled by ice-water. Then, 4 g of an aqueous 25% glutaraldehyde solution and 12 ml of 1 N hydrochloric acid were added under stirring and they were stirred for further two minutes. The aqueous polyvinyl alcohol solution prepared in this way was dispersed into the above-mentioned toluene solution at room temperature, whereby the number of rotation of the stirrer was adjusted so that polyvinyl alcohol beads of 1 mm particle diameter were formed.

The agitation was further continued for 30 minutes at room temperature, and reaction was conducted for further two hours while heating the dispersion at 60° C.

After cooling to room temperature, the reaction product was filtered, washed with 100 ml acetone for five times and then washed sufficiently with water.

(B) Reaction of cross-linked polyvinyl alcohol and glyoxylic acid

Spherical particles of the cross-linked polyvinyl alcohol prepared in the step (A) were dewatered in a centrifuge at 350 G for five minutes and the following reaction was conducted.

To a three-necked round-bottomed flask equipped with a stirrer and a reflux condenser, 320 ml of water was charged, to which 134 g of anhydrous sodium sulfate and 101 ml of concentrated sulfuric acid were added. The solution was elevated by the dilution heat of sulfuric acid. After the solution was cooled to room temperature, the total amount of the cross-linked polyvinyl alcohol dewatered in the centrifuge was added and dispersed in the solution. 33.6 g of glyoxylic acid was further added. After continuous stirring for 30 minutes at room temperature, reaction was conducted for further 8 hours while heating the dispersion at 90° C.

After cooling to room temperature, one-half amount of the reaction solution was withdrawn and the same amount of water was added to the remaining reaction solution. By repeating this procedure twice, the concentration of the salt and acid in the reaction solution was reduced. Then, the reaction product was filtered and washed with water.

The resin thus obtained was added to a three-necked round-bottomed flask containing 500 ml of 2 N sodium hydroxide and purified by heating at 60° C. for 5 hours.

The purified resin was cooled to room temperature, charged in a column and regenerated by passing therethrough 500 ml of 2 N hydrochloric acid at space velocity of 2 and washed well with water.

The thus obtained resin had a moisture content of 44.8%, an exchange capacity of 3.58 meq/g and a swelling volume of 3.9 ml/g.

EXAMPLES 2 to 5:

(A) Production of cross-linked polyvinyl alcohol

Spherical particles of cross-linked polyvinyl alcohol were prepared quite in the same manner as in Example 1(A) excepting for the use of 8 g of an aqueous 25% glutaraldehyde solution.

(B) Reaction of cross-linked polyvinyl alcohol and glyoxylic acid

The cross linked polyvinyl alcohol and glyoxylic acid were brought into a reaction quite in the same manner as in Example 1(B) under the conditions shown in Table 1.

The properties of the resins thus obtained were measured and the results are shown in Table 2.

TABLE 1

|  | Example 2 | Example 3 | Example 4 | Example 5 |
|---|---|---|---|---|
| Cross-linked polyvinyl alcohol (g) | 5 | 5 | 1.8 | 5 |
| Glyoxylic acid (g) | 10 | 10 | 10 | 30 |
| Conc. sulfuric acid (ml) | 47 | 40 | 40 | 47 |
| Sodium sulfate (g) | 30 | 60 | 40 | 18.5 |
| Water (ml) | 100 | 100 | 100 | 100 |

TABLE 2

|  | Example 2 | Example 3 | Example 4 | Example 5 |
|---|---|---|---|---|
| Moisture content (%) | 45.9 | 39.0 | 43.0 | 46.4 |
| Exchange capacity (meq/g) | 4.53 | 3.33 | 4.22 | 5.04 |
| Swelling volume (ml/g) | 3.2 | 2.1 | 2.5 | 2.5 |
| Na/H voluminal ratio | 3.0 | 1.8 | 2.0 | 4.9 |

EXAMPLE 6

The cross-linked polyvinyl alcohol prepared quite in the same manner as in Examples 2–5(A) was subjected to a reaction with glyoxylic acid quite in the same manner as in Example 3 excepting that sodium sulfate was not used.

The obtained resin had moisture content of 43.4%, exchange capacity of 4.32 meq/g, swelling volume of 2.6 ml/g and Na/H voluminal ratio of 7.1. Accordingly, the Na/H voluminal ratio of this resin was significantly greater than that of the ion exchange resins in Example 2 and Example 4 having similar ion exchange capacity.

EXAMPLE 7

(A) Production of cross-linked polyvinyl alcohol

Spherical particles of cross-linked polyvinyl alcohol were prepared quite in the same manner as in Example 3(A) excepting for the use of dichloroethane instead of toluene as the dispersant and for the use of cellulose acetatebutylate (manufactured by Eastman Kodak Co., trade mark CAB 381-20) instead of ethylcellulose as the dispersion stabilizer.

(B) Reaction of cross-linked polyvinyl alcohol and glyoxylic acid

The cross-linked polyvinyl alcohol and glyoxylic acid were reacted quite in the same manner as in Example 3(B) excepting for the use of 31.3 g of sodium hydrogen sulfate instead of sodium sulfate.

The obtained resin had moisture content of 46.4%, exchange capacity of 5.02 meq/g, degree of swelling of 2.2 ml/g and Na/H voluminal ratio of 4.4.

EXAMPLE 8

(A) Production of cross-linked polyvinyl alcohol

To a three-necked round-bottomed flask equipped with a stirrer and a reflux condenser, was charged 80 ml of water, to which 2.8 g of sodium hydroxide was dissolved. 15 g of polyvinyl alcohol (manufactured by The Nippon Synthetic Chemical Industry Co., trade mark GOHSENOL NL-05) was dispersed into the aqueous sodium hydroxide solution and dissolved under heating at 80° C. for one hour.

To another three-necked round-bottomed flask equipped with a stirrer and a reflux condenser, was added a solution of 350 ml kerosene and 5 ml of sorbitan sesquioleate (Kao-Atlas Co., trade mark Arlacel 83) and heated to 80° C. The abovementioned aqueous polyvinyl alcohol solution was dispersed into this kerosine solution at 80° C. under stirring. After continuous heating at 80° C. for 30 minutes, the dispersion was cooled to room temperature while continuing the stirring. When it was cooled to room temperature, 5.1 ml of epichlorohydrin was added to carry out the reaction at room temperature for 24 hours. The resulted beads were filtered and then washed with acetone and with water.

(B) Reaction of cross-linked polyvinyl alcohol and glyoxylic acid

The cross-linked polyvinyl alcohol prepared in the step (A) was dewatered in a centrifuge at 350 G for 5 minutes and then the following reaction was conducted.

To a three-necked round-bottomed flask equipped with a stirrer and a reflux condenser, was charged 240 ml of water, to which were added 102 g of anhydrous solution sulfate and 78 ml of concentrated sulfuric acid. After cooling to room temperature, the total amount of the dewatered cross-linked polyvinyl alcohol was dispersed into the solution. Then 38 g of glyoxylic acid was added to the solution. After one-hour stirring at room temperature, it was heated at 90° C. for 8 hours.

The reaction products were filtered and purified in the same manner as in Example 1.

The thus obtained resin had moisture content of 45.2%, exchange capacity of 3.57meq/g and swelling volume of 3.8 ml/g.

EXAMPLE 9

(A) Production of cross-linked polyvinyl alcohol

Cross-linked polyvinyl alcohol beads were prepared in the same manner as in Example 8(A) excepting that the reaction with epichlorohydrin was conducted at 60° C. for 5 hours.

(B) Reaction of cross-linked polyvinyl alcohol and glyoxylic acid

The cross-linked polyvinyl alcohol and glyoxylic acid were subjected to a reaction in the same manner as in Example 8(B).

The obtained resin had moisture content of 43.0%, exchange capacity of 3.56 meq/g and swelling volume of 3.2 ml/g.

EXAMPLE 10

(A) Production of cross-linked polyvinyl alcohol

To a three-necked round-bottomed flask equipped with a stirrer, was charged 200 g of an aqueous 10% polyvinyl alcohol solution (manufactured by The Nippon Synthetic Chemical Industry Co., trade mark GOHSENOL NL-05), to which 8 ml of an aqueous 25% glutaraldehyde solution was added at room temperature under stirring. 100 g of finely powdered calcium sulfate dihydrate was further added to form a slurry. After the slurry was sufficiently homogenized, 12 ml of 1 N sulfuric acid was rapidly added into the slurry and it was dispersed in a dispersant prepared separately as below:

The dispersant was prepared by dissolving 1 g of cellulose acetatebutylate (manufactured by Eastman Kodak Co., trade mark CAB 381-20) into 400 ml of dichloroethane charged in a three-necked round-bottomed flask equipped with a stirrer and a reflux condenser. After dispersing the above-mentioned slurry into the dispersant under stirring at room temperature, cross-linking reaction was conducted by heating at 60° C. for 2.5 hours.

The reaction product was cooled to room temperature and then filtered, washed with 100 ml of acetone for three times. Then, the product was well washed with water to obtain spherical particles of cross-linked polyvinyl alcohol containing calcium sulfate.

(B) Reaction of cross-linked polyvinyl alcohol and glyoxylic acid

After dewatering the spherical particles of the cross-linked polyvinyl alcohol prepared in the step (A) in a centrifuge at 350 G for 5 minutes, the following reaction was conducted.

To a three-necked round-bottomed flask equipped with a stirrer and a reflux condenser, was charged 100 ml of water, to which 40 g of anhydrous sodium sulfate and 40 ml of concentrated sulfuric acid were added. The temperature of the solution was elevated by the dilution heat of the sulfuric acid. After the solution was cooled to room temperature, 25 g of cross-linked polyvinyl alcohol dewatered in the centrifuge were added and dispersed into the solution. 10 g of glyoxylic acid was further added to the solution. After continuous stirring at room temperature for 30 minutes, the solution was heated further for 8 hours under heating at 90° C.

After cooling to room temperature, one-half amount of the reaction solution was withdrawn and the same amount of water was added to the remaining reaction solution. By repeating this procedure twice, the concentrations of the salt and the acid in the reaction solution were reduced. The reaction product was filtered and washed with water.

(C) Removal of calcium sulfate

The resin prepared in the step (B) and 500 ml of 2 N hydrochloric acid were charged in a three-necked round-bottomed flask equipped with a stirrer agitated at room temperature for two hours. The hydrochloric acid was removed by filtration and another 500 ml of 2 N hydrochloric acid was added. After repeating the above procedure twice, filtration and water washing of the reaction product were conducted. The resin from which the calcium sulfate had been removed, was charged to a three-necked round-bottomed flask containing 500 ml of 2 N sodium hydroxide and purified under heating at 60° C. for 5 hours.

The purified resin was cooled to room temperature, packed in a column, washed with water, then regenerated by passing 300 ml of 2 N hydrochloric acid at space velocity of 2 and well washed with water.

The obtained resin had moisture content of 77.2%, exchange capacity of 4.61 meq/g, swelling volume of 7.0 ml/g, specific surface area of 1.5 m$^2$/g, pore volume of 1.74 ml/g and Na/H voluminal ratio of 1.52.

EXAMPLE 11

(A) Preparation of cross-linked polyvinyl alcohol

The procedures were conducted quite in the same manner as in Example 10.

(B) Removal of calcium sulfate 25 g of spherical particles of cross-linked polyvinyl alcohol containing calcium sulfate were charged in a three-necked round-bottomed flask with a stirrer. Calcium sulfate was removed in the same manner as in Example 10 and cross-linked polyvinyl alcohol containing no calcium sulfate was obtained.

The obtained cross-linked polyvinyl alcohol had moisture content of 74.3%, specific surface area of 0.37 m$^2$/g and pore volume of 0.14 ml/g.

(C) Reaction of cross-linked polyvinyl alcohol and glyoxylic acid

The cross-linked polyvinyl alcohol containing no calcium sulfate prepared in the step (B) was subjected to the reaction glyoxylic acid in the same manner as in Example 10.

The obtained resin had moisture content of 60.2%, exchange capacity of 4.37 meq/g, swelling volume of 3.7 ml/g, specific surface area of 0.1 $m^2/g$ and pore volume of 0.19 ml/g.

EXAMPLE 12

The procedures in this example were the same as in Example 10 excepting for the use of 60 g of calcium sulfate dihydrate in the preparation of cross-linked polyvinyl alcohol containing calcium sulfate.

The obtained resin had moisture content of 70.0%, exchange capacity of 4.67 meq/g, swelling volume of 4.9 ml/g, specific surface area of 1.3 $m^2/g$ and Na/H voluminal ratio of less than 2.

EXAMPLE 13

The procedures in this example were conducted in the same manner as in Example 10 excepting for the use of 12 ml of an aqueous 25% glutaraldehyde solution in the preparation of cross-linked polyvinyl alcohol containing calcium sulfate.

The obtained resin has moisture content of 77.7%, exchange capacity of 4.55 meq/g, swelling volume of 6.9 ml/g, specific surface area of 1.8 $m^2/g$ and Na/H voluminal ratio of less than 2.

EXAMPLE 14

(A) Production of cross-linked polyvinyl alcohol

To a three-necked round-bottomed flask equipped with a stirrer and a reflux condenser, was charged 300 g of an aqueous 10% sodium chloride solution, in which 30 g of polyvinyl alcohol powder (manufactured by The Nippon Synthetic Chemical Industry Co., trade mark GOHSENOL NL-05) was dispersed under stirring. Then it was heated at 90° C. for 8 hours to dissolve the polyvinyl alcohol. After cooling the solution to room temperature, 12 ml of an aqueous 25% glutaraldehyde solution was added to the solution. Further, 18 ml of 1 N hydrochloric acid were rapidly added. After a minute it was dispersed in a dispersant which was separately prepared as below: The dispersant was prepared by dissolving 7.5 g of ethylcellulose (manufactured by Hercules Incorporated, trade mark Ethylcellulose N-100) into 500 ml of toluene charged in a three-necked round-bottomed flask equipped with a stirrer and a condenser. The above-mentioned aqueous polyvinyl alcohol solution was dispersed into the dispersant under stirring at room temperature and, thereafter, cross-linking reaction was conducted by heating at 60° C. for 2.5 hours.

After cooling to room temperature, the reaction product was washed with 100 ml of acetone for three times and then washed sufficiently with water. The specific surface area of the thus obtained resin was 113 $m^2/g$.

(B) Reaction of cross-linked polyvinyl alcohol and glyoxylic acid

The spherical particles of cross-linked polyvinyl alcohol prepared in the step (A) were dewatered in a centrifuge at 350 G for 5 minutes and the following reaction was conducted.

700 ml of water was charged into a three-necked round-bottomed flask equipped with a stirrer and a reflux condenser, to which were added 280 g of anhydrous sodium sulfate and 280 ml of concentrated sulfuric acid. The temperature of the solution was elevated by the dilution heat of the sulfuric acid. After the solution was cooled to room temperature, the cross-linked polyvinyl alcohol dewatered in the centrifuge was dispersed in the solution. 69 g of glyoxylic acid was further added to the solution. After continuous stirring at room temperature for 30 minutes, the reaction was conducted for 8 hours at 90° C.

After filtration and water washing, the reaction product was charged into a three-necked round-bottomed flask containing one liter of 2 N sodium hydroxide and purified by heating at 60° C. for 5 hours. After cooling, it was filtered and washed with water.

The purified resin was packed in a column, regenerated by passing one liter of 2 N hydrochloric acid at space velocity of 2 and then sufficiently washed with water.

The obtained resin had moisture content of 66.6%, exchange capacity of 3.87 meq/g, swelling volume of 4.7 ml/g, specific surface area of 67 $m^2/g$, pore volume of 0.95 ml/g and Na/H voluminal ratio of less than 2.

EXAMPLE 15

(A) Production of cross-linked polyvinyl alcohol

Dispersant was prepared by charging 500 ml of dichloroethane into a three-necked round-bottomed flask equipped with a stirrer and a reflux condenser and dissolving therein 1.5 g of cellulose acetatebutylate (manufactured by Eastman Kodak Co., trade mark CAB 381-20).

200 g of an aqueous 10% polyvinyl alcohol solution (manufactured by The Nippon Synthetic Chemical Industry Co., trade mark GOHSENOL NL-05) was charged to another three-necked round-bottomed flask equipped with a stirrer, and 100 g of an aqueous 20% sodium chloride solution was added to the solution under stirring. 8 ml of 25% glutaraldehyde was added to the solution and 18 ml of 1 N sulfuric acid was further added and stirred rapidly. Then the resultant solution was dispersed into the dispersant referred to above at room temperature. The cross-linking reaction was conducted at 60° C. for 2.5 hours.

After cooling to room temperature, the reaction product was filtered, washed with 100 ml of acetone and then sufficiently washed with water. The obtained resin had specific surface area of 66.8 $m^2/g$.

(B) Reaction of cross-linked polyvinyl alcohol and glyoxylic acid

The procedures were conducted in the same manner as in Example 10. The obtained resin was purified by heating at 60° C. for 5 hours in 500 ml of 2 N sodium hydroxide. After washed with water, the resin was regenerated by passing 300 ml of 2 N hydrochloric acid at space velocity of 2 and then sufficiently washed with water.

The obtained resin had moisture content of 43.6%, exchange capacity of 3.95 meq/g, swelling volume of 2.4 ml/g, specific surface area of 8.2 $m^2/g$, pore volume of 0.1 ml/g and Na/H voluminal ratio of 2.03.

EXAMPLE 16

(A) Production of cross-linked polyvinyl alcohol

To a three-necked round-bottomed flask equipped with a stirrer and a reflux condenser, was charged 95 ml of water, to which 4.3 g of sodium hydroxide was dissolved. 15 g of polyvinyl alcohol powder (manufactured by The Nippon Synthetic Chemical Industry Co., trade mark GOHSENOL NL-05) was dispersed into the aqueous sodium hydroxide solution and dissolved by heating at 80° C. When the solution was made thoroughly homogenous it was cooled to 50° C. and 30 g of finely powdered calcium sulfate dihydrate was added to form slurry. Then, 15.3 ml of epichlorohydrin was added to the slurry and the cross-linking reaction was conducted at 40° C. for 7.5 hours. The obtained resin was filtered and then washed with acetone and water and used for the reaction described below.

(B) Reaction of cross-linked polyvinyl alcohol and glyoxylic acid

The procedures were conducted in the same manner as in Example 10.

(C) Removal of calcium sulfate

The procedures were conducted in the same manner as in Example 10. The obtained resin had water content of 60.6%, exchange capacity of 3.83 meq/g and specific surface area of 12.8 m$^2$/g.

Measurement for the acidity of ion exchange resin

EXAMPLE 17 (MEASUREMENT FOR THE ACIDITY OF ION EXCHANGE RESIN):

0.2 g of fine powder of DIAION WK20 (registered trade mark of Mitsubishi Chemical Industries Limited, polyacrylic acid type ion-exchange resin) was dispersed in 100 ml of an aqueous 0.03 N sodium chloride solution and neutralizing titration on the slurry was conducted using an aqueous 0.2 N sodium hydroxide solution containing 0.03 N sodium chloride. The pH value as determined at a load rate of 0.5 was 6.9.

On the other hand, the pH value determined at the load rate of 0.5 in the same manner as above-mentioned was 5.0 for the finely powdered ion exchange resin obtained in Example 4.

Accordingly, it was confirmed that the weakly acidic cation exchange resin according to this invention had a higher acidity than that of the conventional polyacrylic acid type resin.

What is claimed is:

1. A weakly acidic cation exchange resin which is obtainable by a reaction of glyoxylic acid and a polyvinyl alcohol cross-linked by cross-linking groups each containing two or more carbon atoms, and has an exchange capacity of 3 meq/g or greater and a swelling volume of 10 ml/g or smaller.

2. The weakly acidic cation exchange resin as defined in claim 1, wherein said swelling volume is 5 ml/g or smaller and the voluminal ratio of the Na form to H form of the resin is 3 or smaller.

3. The weakly acidic cation exchange resin is defined in claim 2, wherein said polyvinyl alcohol is cross-linked by glutaraldehyde.

4. The weakly acidic cation exchange resin as defined in claim 2, wherein said polyvinyl alcohol is cross-linked by epichlorohydrin.

5. A porous weakly acidic cation exchange resin which is obtainable by a reaction of glyoxylic acid and a polyvinyl alcohol cross-linked by cross-linking groups each containing two or more carbon atoms, and has an exchange capacity of 3 meq/g or greater, a swelling volume of 10 ml/g or smaller and a specific surface area of 0.5 m$^2$/g or greater and/or a pore volume of 0.1 ml/g or greater.

6. The porous weakly acidic cation exchange resin as defined in claim 5, wherein said swelling volume is 5 ml/g or smaller.

7. The porous weakly acidic cation exchange resin as defined in claim 5, wherein said specific surface area is 5 m$^2$/g or greater.

8. The porous weakly acidic cation exchange resin as defined in claim 5, wherein the voluminal ratio of the Na form to the H form of the resin is 2 or smaller.

9. The porous weakly acidic cation exchange resin as defined in claim 5, wherein said polyvinyl alcohol is crosslinked by glutaraldehyde.

10. The porous weakly acidic cation exchange resin as defined in claim 5, wherein said polyvinyl alcohol is crosslinked by epichlorohydrin.

11. The cation exchange resin of claim 1, wherein said polyvinyl alcohol is cross-linked by a member of the group consisting of glyoxal, glutaraldehyde and terephthaladehyde.

12. The cation exchange resin of claim 1, wherein said polyvinyl alcohol is cross-linked by 1,2-3, 4-diepoxy butane.

13. The cation exchange resin of claim 1, wherein said polyvinyl alcohol is cross-linked by a member selected from the group consisting of bis-epoxypropylether, ethyleneglycol bis-epoxypropylether and 1,4-butanediol bis-epoxypropylether.

14. The cation exchange resin of claim 1, wherein said polyvinyl alcohol is cross-linked by epichlorohydrin or epibromohydrin.

15. The cation exchange resin of claim 1, wherein the cation exchange groups contain a structure of the formula:

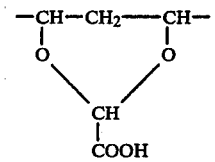

* * * * *